US008649517B2

(12) United States Patent
Xiao et al.

(10) Patent No.: US 8,649,517 B2
(45) Date of Patent: Feb. 11, 2014

(54) RECEIVING METHOD, TERMINAL EQUIPMENT AND RECEIVING DEVICE FOR MOBILE DIGITAL MULTIMEDIA SERVICE

(75) Inventors: Longan Xiao, Shenzhen (CN); Shiliang Guo, Shenzhen (CN); Xiaoling Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 106 days.

(21) Appl. No.: 13/380,927

(22) PCT Filed: Aug. 10, 2010

(86) PCT No.: PCT/CN2010/075842
§ 371 (c)(1),
(2), (4) Date: Dec. 27, 2011

(87) PCT Pub. No.: WO2011/018026
PCT Pub. Date: Feb. 17, 2011

(65) Prior Publication Data
US 2012/0133830 A1 May 31, 2012

(30) Foreign Application Priority Data
Aug. 14, 2009 (CN) .......................... 2009 1 0165286

(51) Int. Cl.
*H04N 7/167* (2011.01)

(52) U.S. Cl.
USPC ........................................... 380/241; 725/25

(58) Field of Classification Search
USPC ................................ 380/200–242; 725/25–31
See application file for complete search history.

(56) References Cited

U.S. PATENT DOCUMENTS 6,069,956 A *   5/2000   Kurihara ..................... 380/212
6,742,182 B1 *  5/2004   Perlman ....................... 725/25
2005/0047596 A1 *  3/2005   Suzuki ......................... 380/239
2005/0152546 A1 *  7/2005   Kangas ......................... 380/210
2007/0189525 A1 *  8/2007   Wajs ............................ 380/42
2008/0144820 A1 *  6/2008   Hong .......................... 380/212

FOREIGN PATENT DOCUMENTS

| CN | 1901669 A | 1/2007 |
| CN | 101072334 A | 11/2007 |
| CN | 101083753 A | 12/2007 |
| CN | 101325684 A | * 12/2008 |
| CN | 101656866 A | 2/2010 |
| WO | WO 0137562 A1 | * 5/2001 |

OTHER PUBLICATIONS

International Search Report for PCT/CN2010/075842 dated Nov. 4, 2010.

* cited by examiner

*Primary Examiner* — Jason K. Gee
*Assistant Examiner* — Christopher C Harris
(74) *Attorney, Agent, or Firm* — Ling Wu; Stephen Yang; Ling and Yang Intellectual Property

(57) ABSTRACT

The present invention provides a method and a device for receiving a mobile digital multimedia service and terminal equipment for a mobile digital multimedia service, and the method for receiving the mobile digital multimedia service includes: a receiving device receiving multimedia broadcast data, and if the receiving device judges that a state of the multimedia broadcast data is a scrambling state, descrambling the multimedia broadcast data, and sending descrambled multimedia broadcast data to computer equipment, and the computer equipment receiving the descrambled multimedia broadcast data. The technical scheme of the present invention does not need to send key information needed in descrambling to the computer equipment, so that the security of the key information can be increased; and the receiving device re-encapsulates the multiplex subframe and retains the subframe header part in the multiplex subframe, so as to make the descrambled data code steam entirely retain the original information.

7 Claims, 3 Drawing Sheets

RECEIVING METHOD, TERMINAL EQUIPMENT AND RECEIVING DEVICE FOR MOBILE DIGITAL MULTIMEDIA SERVICE

TECHNICAL FIELD

The present invention relates to a technical field of the China Mobile Multimedia Broadcasting (CMMB), and especially, to a method and a device for receiving a mobile digital multimedia service and terminal equipment for a mobile digital multimedia service.

BACKGROUND OF THE RELATED ART

The standards of the CMMB technique adapt to broadcasting service frequencies in the frequency range from 30 MHz to 3000 MHz, national roaming can be implemented by a broadcasting system of multimedia signals of satellites and/or terrestrial wireless transmitting televisions, broadcasts and data information, etc., and the transmission technique uses a mobile multimedia broadcasting technique Satellite Terrestrial Interactive Multi-service Infrastructure (STiMi) technique.

With the development of mobile multimedia services, the CMMB service presents three trends.

1. More and more diversified terminal equipment and the receiving devices. With the development of the mobile multimedia services, most of terminal equipment, such as mobile phones, Personal Digital Assistants (PDA), MP4s, digital cameras and laptops, etc., receive multimedia service data via a built-in CMMB receiving device, and display multimedia service data to the user. In addition, a part of receiving devices, such as data cards and netbook modules, etc., acts as an independent function device rather than is built in the terminal equipment, and such receiving devices can be connected to the display terminals, such as computers/laptops, etc.

2. The diversification of service types. With the development of the mobile multimedia services, the focus of the next step is to improve the multi-service support of CMMB terminals. Besides providing the basic audio and video services, CMMB shall also provide varied data services including browsing news, inquiring traffic information, shopping, advertising and interaction, etc., and such fresh and abundant service experience will obtain wider and wider attentions and applications.

3. The commercialization of service operations. With the development of the mobile multimedia broadcasting service, operators begin to perform the scrambling control on multimedia services, namely, the Conditional Access System (CAS) is added into the CMMB for controlling the user to receive services, and that is, only the user with the specified authorization can enjoy the provided corresponding service, which is the key point in implementing the personalized services. The basic object is to perform authorization control and authorization management on the user in the service operation, thereby implementing the paid service of the service system.

According to the three trends mentioned above, the receiving device connected with computer equipment, such as laptops, etc., will attract more and more attentions and be applied wider and wider. However, after general receiving device receiving the code streams of multimedia service data, there are two ways of descrambling and presentation processing on the code streams:

(1) the receiving device is only in charge of receiving the mobile multimedia broadcasting service, transmitting the data code stream to the computer equipment side where the descrambling processing and presentation of the multimedia service will be performed;

(2) the receiving device is in charge of receiving the mobile multimedia broadcasting service, and performing the descrambling process and then sending the descrambled data to the computer equipment side for presenting the multimedia service.

In the above way (1), in the condition of the user authentication module or the conditional receiving module being located in the receiving device, it will be involved that the key information needed in descrambling will be transmitted to the computer equipment side, which has certain unsafe factors.

In the above way (2), since the descrambled data are directly sent to the computer equipment side, other information like multiplex subframe header information in a plurality of multiplex subframes will be lost, which brings troubles to the data processing at the computer equipment side. Sometimes, the computer equipment also should read the multiplex subframe header information from the receiving equipment multiple times.

SUMMARY OF THE INVENTION

The technical problems to be solved in the present invention is to provide a method and a device for receiving a mobile digital multimedia service and terminal equipment for a mobile digital multimedia service, so as to improve the security of the key information, and to make the service presentation of the CMMB more consummate and convenient.

In order to solve the problems mentioned above, the present invention provides a method for receiving a mobile digital multimedia service, and the method comprises:

a receiving device receiving multimedia broadcast data, and if the receiving device judges that a state of the multimedia broadcast data is a scrambling state, descrambling the multimedia broadcast data, and sending descrambled multimedia broadcast data to computer equipment, and the computer equipment receiving the descrambled multimedia broadcast data.

The above method can be further characterized in that:

after the step of descrambling the multimedia broadcasting data, and before the step of sending the descrambled multimedia broadcasting data to the computer equipment, the method further comprises: indicating a descrambling state;

in the step of descrambling the multimedia broadcasting data, indicating the descrambling state and sending the descrambled multimedia broadcasting data to the computer equipment, the receiving device analyzes to obtain a multiplex subframe from the multimedia broadcasting data and descrambles multimedia data in the multiplex subframe, and fills descrambled multimedia data in an original multiplex subframe, indicates the descrambling state in a subframe header of the original multiplex subframe, recalculates and updates Cyclic Redundancy Check (CRC) data in the subframe header of the original multiplex subframe, and sends the multiplex subframe to the computer equipment;

after the step of the computer equipment receiving the descrambled multimedia broadcasting data, the method further comprises:

when the computer equipment checks that subframe header data are correct according to the CRC data included in the subframe header of the multiplex subframe received from the receiving device and judges that the subframe header indicates the descrambling state, displaying the descrambled multimedia data included in the multiplex subframe to a user.

In order to solve the above technical problem, the present invention further provides terminal equipment for a mobile digital multimedia service, which comprises a receiving device and a computer equipment, the receiving device comprises a first code stream receiving module, a code stream demultiplexing module, a first scrambling state judging module, a code stream descrambling module, a framing module and a code stream sending module which are connected in turn; wherein the first code stream receiving module of the receiving device is configured to: receive multimedia broadcasting data from a system side and forward the multimedia broadcasting data to the code stream demultiplexing module; the code stream demultiplexing module of the receiving device is configured to: analyze to obtain each multiplex subframe from the multimedia broadcasting data that are received and send each multiplex subframe to the first scrambling state judging module; the first scrambling state judging module of the receiving device is configured to: forward each multiplex subframe to the code stream descrambling module when judging that a subframe header of the multiplex subframe that is received indicates a scrambling state; the code stream descrambling module of the receiving device is configured to: descramble multimedia data in the multiplex subframe and send descrambled multimedia data to the framing module; the framing module of the receiving device is configured to: re-encapsulate the descrambled multimedia data into an original multiplex subframe and send the multiplex subframe to the code stream sending module after receiving the descrambled multimedia data from the code stream descrambling module; the code stream sending module of the receiving device is configured to: send the multiplex subframe that is received to the computer equipment; the computer equipment is configured to: receive the multiplex subframe including the descrambled multimedia data.

The above terminal equipment can be further characterized in that:

the computer equipment comprises a second code stream receiving module, a second scrambling state judging module and a displaying module which are connected in turn; the framing module of the receiving device is further configured to: change a scrambling indication bit in the subframe header of the original multiplex subframe to make the scrambling indication bit indicate a descrambling state, and recalculate Cyclic Redundancy Check (CRC) data of the subframe header of the original multiplex subframe, and write new CRC data into a CRC field of the original multiplex subframe; re-encapsulate the descrambled multimedia data into the original multiplex subframe and then send the original multiplex subframe that is re-encapsulated to the code stream sending module; the second code stream receiving module of the computer equipment is configured to: receive the multiplex subframe from the receiving device, and send the multiplex subframe to the second scrambling state judging module after checking that subframe header data are correct according to the CRC data included in the subframe header; the second scrambling state judging module of the computer equipment is configured to: send the multimedia data of the multiplex subframe to the displaying module when judging that the subframe header of the multiplex subframe that is received indicates the descrambling state; the displaying module of the computer equipment is configured to: display the multimedia data that are received to a user.

The above terminal equipment can be further characterized in that:

the receiving device is independent from the computer equipment and has an interface for connecting with the computer equipment, or, the receiving device is built in the computer equipment.

The above terminal equipment can be further characterized in that:

the receiving device is a data card with a function of receiving the multimedia broadcasting data or a multimedia broadcasting data receiving module built in a laptop.

The above terminal equipment can be further characterized in that:

the first scrambling state judging module of the receiving device is further connected with the code stream sending module; the first scrambling state judging module of the receiving device is further configured to: send the multiplex subframe to the code stream sending module when judging that the subframe header of the multiplex subframe that is received indicates an unscrambling state; the code stream sending module of the receiving device is configured to: send the multiplex subframe received from the first scrambling state judging module to the computer equipment.

In order to solve the above technical problem, the present invention further provides a receiving device for a mobile digital multimedia service, and the receiving device comprises a code stream receiving module, a code stream demultiplexing module, a scrambling state judging module, a code stream descrambling module, a framing module and a code stream sending module which are connected in turn; wherein the code stream receiving module of the receiving device is configured to: receive the multimedia broadcasting data from a system side and forward the multimedia broadcasting data to the code stream demultiplexing module; the code stream demultiplexing module of the receiving device is configured to: analyze to obtain each multiplex subframe from the multimedia broadcasting data that are received and send each multiplex subframe to the scrambling state judging module; the scrambling state judging module of the receiving device is configured to forward each multiplex subframe to the code stream descrambling module when judging that a subframe header of the multiplex subframe that is received indicates a scrambling state; the code stream descrambling module of the receiving device is configured to: descramble the multimedia data in the multiplex subframe and send descrambled multimedia data to the framing module; the framing module of the receiving device is configured to: re-encapsulate the descrambled multimedia data into an original multiplex subframe and send a multiplex subframe to the code stream sending module after receiving the descrambled multimedia data from the code stream descrambling module; the code stream sending module of the receiving device is configured to send the multiplex subframe that is received to computer equipment.

The above device can be further characterized in that:

the framing module of the receiving device is further configured to: change a scrambling indication bit in the subframe header of the original multiplex subframe to make the scrambling indication bit to indicate a descrambling state, and recalculate Cyclic Redundancy Check (CRC) data of the subframe header of the original multiplex subframe, and write new CRC data into a CRC field of the original multiplex subframe; re-encapsulate the descrambled multimedia data into the original multiplex subframe and then send the original multiplex subframe that is re-encapsulated to the code stream sending module.

The above terminal equipment can be further characterized in that:

the receiving device is a data card with a function of receiving the multimedia broadcasting data or a multimedia broadcasting data receiving module built in a laptop.

In the present invention, the receiving device completes the descrambling operation without transmitting the key information needed in descrambling to the computer equipment, so that the security of the key information can be increased; and the receiving device re-encapsulates the multiplex subframe and retains the subframe header part in the multiplex subframe, so as to make the descrambled data code steam entirely retain the original information, and the receiving device transmits the whole multiplex subframe to the computer device to make the data code stream processing and the service presentation of the computer device more convenient.

PREFERRED EMBODIMENTS OF THE PRESENT INVENTION

Figure 1:
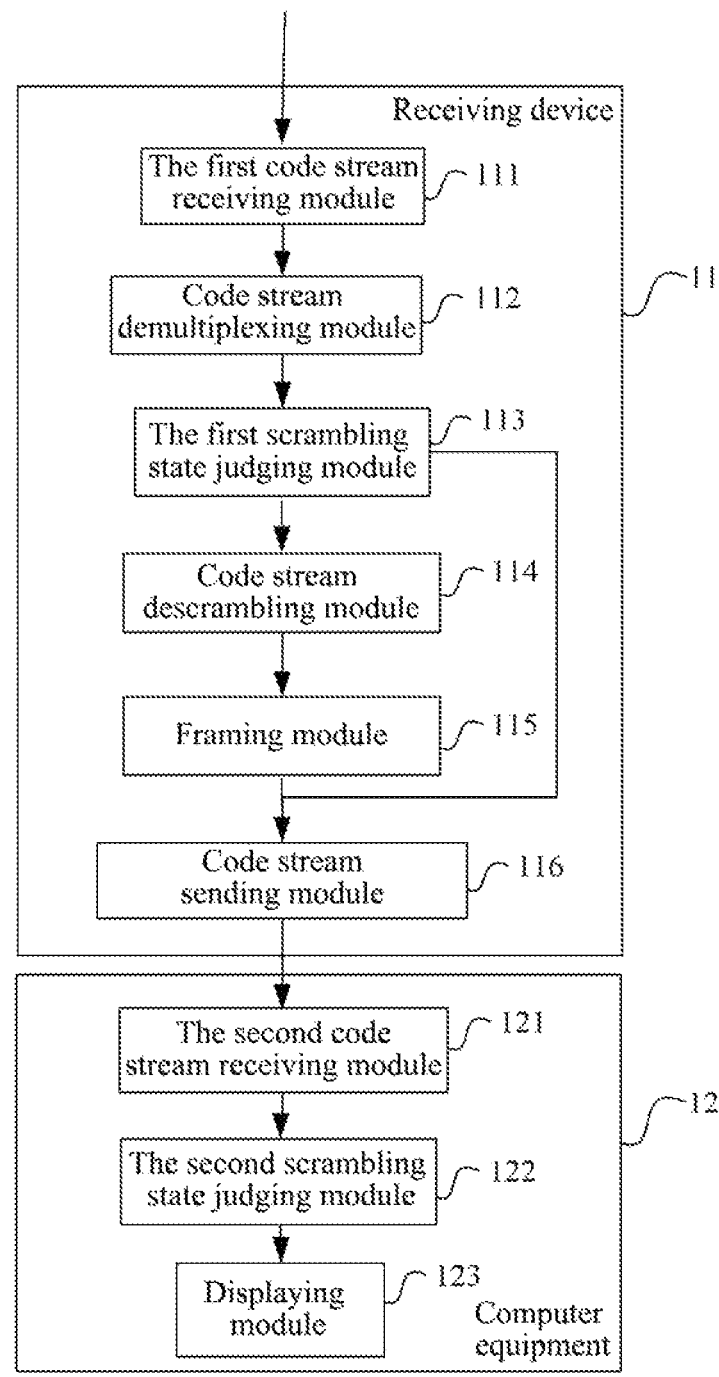
FIG. 1 is a structure diagram of the composition of the terminal equipment for the mobile digital multimedia service according to the examples.

As shown in FIG. 1, the terminal equipment for the mobile digital multimedia service comprises the receiving device 11 and the computer equipment 12, the receiving device 11 can be independent from the computer equipment 12 and have an interface for connecting with the computer equipment 12, such as the data card products with the function of receiving the multimedia broadcasting data and so on. The receiving device 11 can also be the built-in device that is built in the computer equipment, such as the built-in module for receiving multimedia broadcasting data of the laptop and so on.

The receiving device 11 comprises the first code stream receiving module 111, the code stream demultiplexing module 112, the first scrambling state judging module 113, the code stream descrambling module 114, the framing module 115 and the code stream sending module 116 which are connected in turn; the first scrambling state judging module 113 is also connected with the code stream sending module 116; the computer equipment 12 comprises the second code stream receiving module 121, the second scrambling state judging module 122 and the displaying module 123 which are connected in turn;

the first code stream receiving module of the receiving device is configured to: receive the multimedia broadcasting data from the system side, and forward the multimedia broadcasting data to the code stream demultiplexing module;

the code stream demultiplexing module of the receiving device is configured to: analyze to obtain each multiplex subframe from the received multimedia broadcasting data, and send each multiplex subframe to the first scrambling state judging module;

the first scrambling state judging module of the receiving device is configured to: forward the multiplex subframe to the code stream descrambling module if the subframe header of the received multiplex subframe indicates the scrambling state; forward the multiplex subframe to the code stream sending module if the subframe header of the received multiplex subframe indicates the unscrambling state;

the code stream descrambling module of the receiving device is configured to analyze to obtain the multimedia data (including video data, audio data and data service information, specifically analyze to obtain the video data from the video field of the multiplex subframe, analyze to obtain the audio data from the audio field of the multiplex subframe and analyze to obtain the data service information from the data field of the multiplex subframe) from the multiplex subframe received from the first scrambling state judging module, descramble the multimedia data in the multiplex frame, and then send the descrambled multimedia data to the framing module; wherein in the implementation of the descrambling function of this module, a specific conditional access system needs to be equipped to complete the descrambling function, and that part of content has been standardized and is no more repeated here;

the framing module of the receiving device is configured to: receive the descrambled multimedia data from the code stream descrambling module and then to re-encapsulate the descrambled multimedia data into the original multiplex subframe to send to the code stream sending module; or to change the scrambling indication bit in the subframe header of the original multiplex subframe to make the scrambling indication bit indicate the descrambling state, recalculate the Cyclic Redundancy Check (CRC) data in the subframe header of the original multiplex subframe, write the new CRC data into the CRC check field in the original multiplex subframe, and re-encapsulate the descrambled multimedia data into the original multiplex subframe and send the re-encapsulated original multiplex subframe to the code stream sending module;

the code stream sending module of the receiving device is configured to: send the multiplex subframe received from the framing module or the first scrambling state judging module to the computer equipment.

The computer equipment is configured to: receive the multiplex subframe from the receiving device and display the multimedia data in the multiplex subframe to the user;

the second code stream receiving module of the computer equipment is configured to: receive the multiplex subframe from the receiving device, and send the multiplex subframe to the second scrambling state judging module after checking that the subframe header data are correct according to the CRC data included in the subframe header;

the second scrambling state judging module of the computer equipment is configured to: send the multimedia data in the multiplex subframe to the displaying module when it is judged that the subframe header of the received multiplex subframe indicates the descrambling state or undescrambling state;

the displaying module is configured to: display the received multimedia data to the user.

The above terminal equipment implements the descrambling operation on multimedia broadcasting data in the receiving device without sending the key information needed in descrambling to the computer equipment, so that the security of the key information can be increased; and the terminal equipment re-encapsulates the multiplex subframe in the receiving device and retains the subframe header part in the multiplex subframe, so as to make the code steam transmitted to the computer device retain the whole information of the multiplex subframe and make the data code stream processing and the service presentation of the computer device more convenient. In addition, the receiving device changes the scrambling indication identifier in the subframe header of the multiplex subframe according to the processing, which can make the data state in the flow of data clear.

Figure 2:
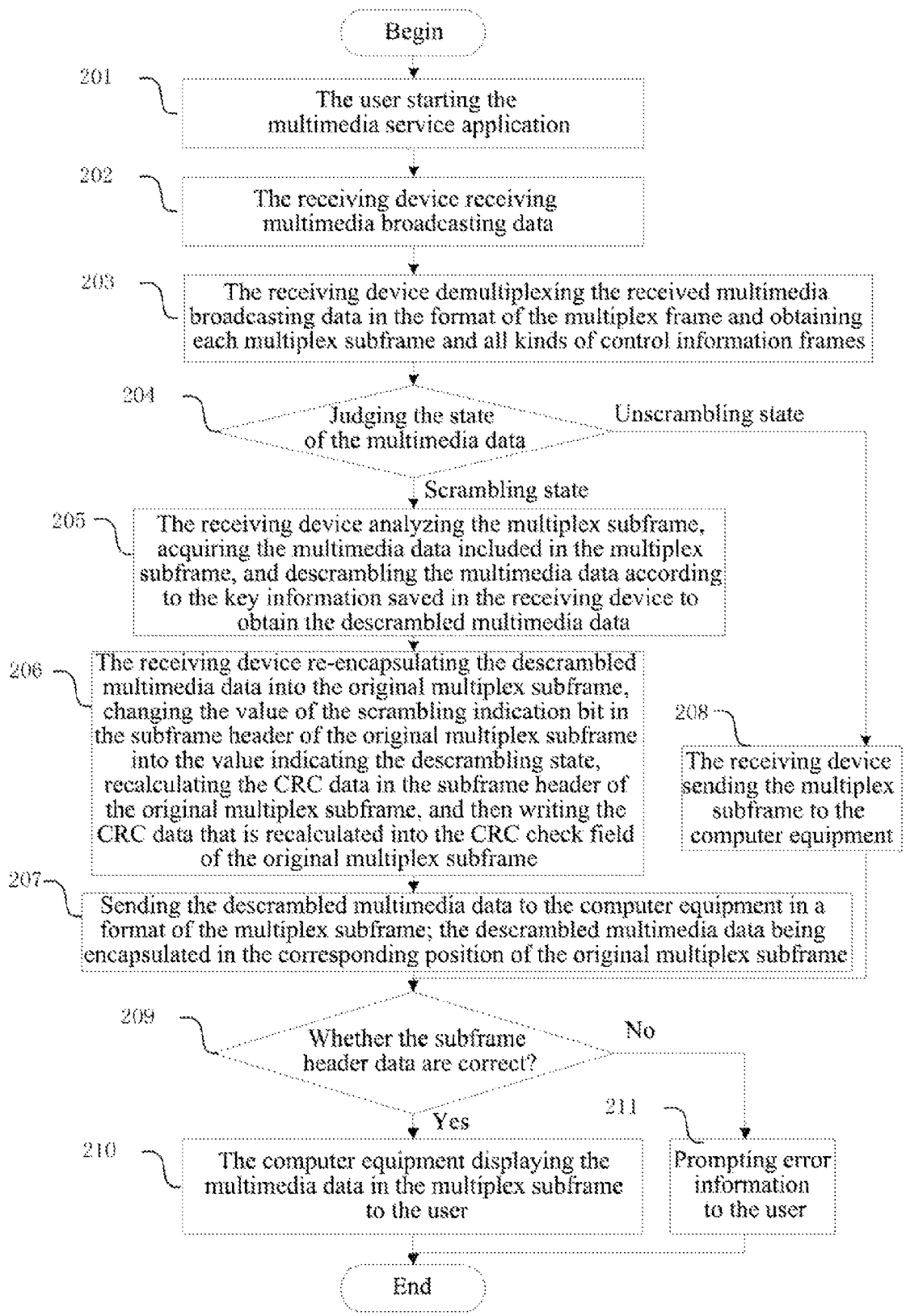
FIG. 2 is a flow chart of the method for receiving the mobile digital multimedia service according to the examples.
Figure 3:
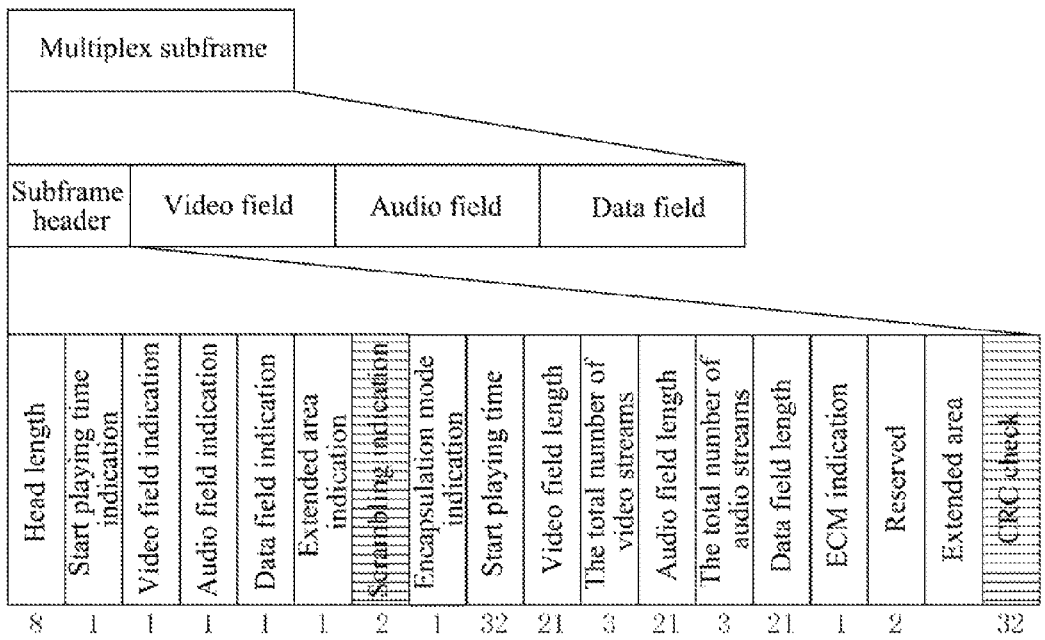
FIG. 3 is a structure diagram of the multiplex subframe of the multimedia broadcasting data.

As shown in FIG. 2, the method for receiving the mobile digital multimedia service comprises the following steps:

step 201, the user starts the multimedia service application;

step 202, the receiving device receives multimedia broadcasting data which is sent in a format of the multiplex frame;

step 203, the receiving device demultiplexes the received multimedia broadcasting data in the format of the multiplex frame and obtains each multiplex subframe and all kinds of control information frames;

step 204, the receiving device judges the state of the multimedia data included in the multiplex subframe according to the scrambling indication field in the subframe header of the multiplex subframe, and if it is judged that the state of the multimedia data is the scrambling state, performs step 205, if it is judged that the state of the multimedia data is the unscrambling state, performs step 208;

as the structure diagram of the multiplex subframe is shown in FIG. 3, the subframe header of the multiplex subframe includes the scrambling indication field and the CRC check field. The scrambling indication field is a two bits field for indicating the state of the multimedia data included in the multiplex subframe, which is specifically as follows: "00" denotes that the multimedia data included in the multiplex subframe are in an unscrambling state, "01" denotes that the multimedia data included in the multiplex subframe are in a descrambling state, "10" denotes that the multimedia data included in the multiplex subframe are in a scrambling state and "11" is a reserved value. The CRC check field denotes the CRC data obtained after performing the CRC check on the multiplex subframe;

step 205, the receiving device analyzes the multiplex subframe to acquire the multimedia data included in the multiplex subframe, and descrambles the multimedia data according to the key information saved in the receiving device to obtain the descrambled multimedia data;

step 206, the receiving device re-encapsulates the descrambled multimedia data into the original multiplex subframe, changes the value of the scrambling indication bit in the subframe header of the original multiplex subframe to make the scrambling indication bit indicate the descrambling state, recalculates the CRC data of the subframe header of the original multiplex subframe, and then writes the new CRC data into the CRC check field of the original multiplex subframe;

as shown in FIG. 3, in the subframe header of the multiplex subframe, indicating the descrambling state namely is to set the scrambling indication field of the subframe header of the multiplex subframe as "01" to denote that the multimedia data have been descrambled;

step 207, the receiving device sends the descrambled multimedia data to the computer equipment in a format of the multiplex subframe; the descrambled multimedia data are encapsulated in the corresponding position of the original multiplex subframe, namely, in the descrambled multimedia data, the video data are encapsulated in the video field of the original multiplex frame, the audio data are encapsulated in the audio field of the original multiplex frame and the data service information are encapsulated in the data fields of the original multiplex frame; step 209 is performed;

step 208, the receiving device sends the multiplex subframe to the computer equipment;

step 209, the computer equipment receives the multimedia data in the format of multiplex subframe from the receiving device, analyzes to obtain each multiplex subframe, and then judges whether subframe header data are correct according to the CRC data included in the subframe header, if yes, performs step 210; if not, performs step 211;

step 210, the computer equipment displays the multimedia data in the multiplex subframe to the user, and then the flow ends;

in step 210, the multimedia data in the multiplex subframe may be performed the descrambling operation by the receiving device, or may be un-descrambled data without additional processes of the receiving device. The computer equipment can also judge the scrambling indication in the subframe header of the multiplex subframe to obtain whether multimedia data are in the descrambling state or in the unscrambling state, which will all not affect the display of the multimedia data;

step 211, error information is prompted to the user; and then the flow ends.

In the above methods, the receiving device can not only not indicate the descrambling state in the subframe header of the multiplex subframe but also not update the CRC data in the multiplex subframe after successfully descrambling the multimedia data in the multiplex subframe, and the receiving device encapsulates the descrambled multimedia data in the format of the multiplex subframe and then sends the descrambled multimedia data to the computer equipment. The computer equipment can directly display the descrambled multimedia data included in the multiplex subframe to the user without judging whether the subframe header of multiplex subframe is correct or not or whether the subframe header indicates descrambling state or not after receiving the descrambled multimedia data.

The above methods does not need to send the key information needed in descrambling to the computer equipment, so that the security of the key information can be increased; and the receiving device re-encapsulates the multiplex subframe and retains the subframe header part in the multiplex subframe, so as to make the descrambled data code steam entirely retain the original information and make the data code stream processing and the service presentation of the computer device more convenient. In addition, the increased operation in the receiving device of indicating the descrambled state can make the data state in the flow of data clear.

The person having ordinary skill in the art can understand all or parts of the steps in the above methods can instruct the relevant hardware to complete via a program, and the program can be stored in the readable storage medium of the computer, such as the read-only memory, the disc disk, and the optical disk, etc. Optionally, all or parts of steps in the above examples can be implemented using one or more integrated circuits. Accordingly, each module/unit in the above examples can be implemented in the form of hardware or software function module. The present invention is not limited to any specific form of the combination of hardware and software.

Certainly, the present invention can also have a variety of other examples, and those skilled in the art can make various corresponding changes and transformations according to the present invention without departing from spirit and essence of the present invention, however, these corresponding changes and transformations shall all fall into the protection scope of the appended claims of the present invention.

Industrial Applicability

The method and the device for receiving a mobile digital multimedia service and terminal equipment for a mobile digital multimedia service provided in the present invention do not need to send key information needed in descrambling to the computer equipment, so that the security of the key information can be increased; and the receiving device re-encapsulates the multiplex subframe and retains the subframe header part in the multiplex subframe, so as to make the descrambled data code steam entirely retain the original information and make the data code stream processing and the service presentation of the computer device more convenient. In addition, the increased operation in the receiving device of indicating the descrambled state can make the data state in the flow of data clear.

What is claimed is:

1. A method for receiving a mobile digital multimedia service, comprising:

a receiving device receiving multimedia broadcast data, analyzing to obtain a multiplex subframe from the multimedia broadcasting data; when judging that a subframe header of the multiplex subframe indicates a scrambling state, descrambling to obtain multimedia data in the multiplex subframe;

the receiving device filling the descrambled multimedia data in corresponding fields of the multiplex subframe in which the original scrambled multimedia data locates, indicating a descrambling state in the subframe header of the multiplex subframe, and recalculating and updating Cyclic Redundancy Check (CRC) data in the subframe header of the multiplex subframe; and the receiving device sending the multiplex subframe to a computer equipment; and the computer equipment receiving the descrambled multimedia broadcast data, checking that subframe header data are correct according to the CRC data included in the subframe header of the multiplex subframe received from the receiving device, and when judging that the subframe header indicates the descrambling state, displaying the descrambled multimedia data included in the multiplex subframe to a user.

2. Terminal equipment for a mobile digital multimedia service, comprising a receiving device and a computer equipment, the receiving device comprising a first code stream receiving module, a code stream demultiplexing module, a code stream descrambling module, a framing module and a code stream sending module which are connected in turn; wherein the first code stream receiving module of the receiving device is configured to: receive multimedia broadcasting data from a system side and forward the multimedia broadcasting data to the code stream demultiplexing module;

the code stream demultiplexing module of the receiving device is configured to: analyze to obtain each multiplex subframe from the multimedia broadcasting data that are received and send each multiplex subframe to the code stream descrambling module;

the code stream descrambling module of the receiving device is configured to: when judging that a subframe header of the multiplex subframe that is received indicates a scrambling state, descramble multimedia data in the multiplex subframe and send descrambled multimedia data to the framing module;

the framing module of the receiving device is configured to: re-encapsulate the descrambled multimedia data into an original multiplex subframe and send the multiplex subframe to the code stream sending module after receiving the descrambled multimedia data from the code stream descrambling module;

the code stream sending module of the receiving device is configured to: send the multiplex subframe that is received to the computer equipment;

the computer equipment is configured to: receive the multiplex subframe including the descrambled multimedia data; and wherein, the computer equipment comprises a second code stream receiving module and a displaying module which are connected in turn;

the framing module of the receiving device is further configured to: change a scrambling indication bit in the subframe header of the original multiplex subframe to make the scrambling indication bit indicate a descrambling state, and recalculate Cyclic Redundancy Check (CRC) data of the subframe header of the original multiplex subframe, and write new CRC data into a CRC field of the original multiplex subframe; re-encapsulate the descrambled multimedia data into the original multiplex subframe and then send the original multiplex subframe that is re-encapsulated to the code stream sending module;

the second code stream receiving module of the computer equipment is configured to: receive the multiplex subframe from the receiving device, and send the multiplex subframe to the displaying module after checking that subframe header data are correct according to the CRC data included in the subframe header; and the displaying module of the computer equipment is configured to: when judging that the subframe header of the multiplex subframe that is received indicates the descrambling state, display the multimedia data of the multiplex subframe that is received to a user.

3. The terminal equipment according to claim 2, wherein the receiving device is independent from the computer equipment and has an interface for connecting with the computer equipment, or, the receiving device is built in the computer equipment.

4. The terminal equipment according to claim 2, wherein the receiving device is a data card with a function of receiving the multimedia broadcasting data or a multimedia broadcasting data receiving module built in a laptop.

5. The terminal equipment according to claim 2, wherein the code stream sending module of the receiving device is further configured to: receive the multiplex subframe from the code stream demultiplexing module of the receiving device when judging that the subframe header of the multiplex subframe that is received indicates an unscrambling state, and send the received multiplex subframe to the computer equipment.

6. A receiving device for a mobile digital multimedia service, the receiving device comprising a code stream receiving module, a code stream demultiplexing module, a code stream descrambling module, a framing module and a code stream sending module which are connected in turn; wherein the code stream receiving module of the receiving device is configured to: receive the multimedia broadcasting data from a system side and forward the multimedia broadcasting data to the code stream demultiplexing module;

the code stream demultiplexing module of the receiving device is configured to: analyze to obtain each multiplex subframe from the multimedia broadcasting data that are received and send each multiplex subframe to the code stream descrambling module;

the code stream descrambling module of the receiving device is configured to: when judging that a subframe header of the multiplex subframe that is received indicates a scrambling state, descramble the multimedia data in the multiplex subframe and send descrambled multimedia data to the framing module;

the framing module of the receiving device is configured to: re-encapsulate the descrambled multimedia data into an original multiplex subframe and send a multiplex subframe to the code stream sending module after receiving the descrambled multimedia data from the code stream descrambling module;

the code stream sending module of the receiving device is configured to send the multiplex subframe that is received to computer equipment; and wherein, the framing module of the receiving device is further configured to: change a scrambling indication bit in the subframe header of the original multiplex subframe to make the scrambling indication bit to indicate a descrambling state, and recalculate Cyclic Redundancy Check (CRC) data of the subframe header of the original multiplex subframe, and write new CRC data into a CRC field of the original multiplex subframe; re-encapsulate the descrambled multimedia data into the original multiplex subframe and then send the original multiplex subframe that is re-encapsulated to the code stream sending module.

7. The device according to claim 6, wherein the receiving device is a data card with a function of receiving the multimedia broadcasting data or a multimedia broadcasting data receiving module built in a laptop.

* * * * *